(12) United States Patent
Seder et al.

(10) Patent No.: US 11,880,036 B2
(45) Date of Patent: Jan. 23, 2024

(54) CONTROL OF AMBIENT LIGHT REFLECTED FROM PUPIL REPLICATOR

(71) Applicant: GM GLOBAL TECHNOLOGY OPERATIONS LLC, Detroit, MI (US)

(72) Inventors: Thomas A. Seder, Fraser, MI (US); Kai-Han Chang, Madison Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 121 days.

(21) Appl. No.: 17/379,575

(22) Filed: Jul. 19, 2021

(65) Prior Publication Data
US 2023/0017795 A1 Jan. 19, 2023

(51) Int. Cl.
*G02B 27/01* (2006.01)
*G02B 27/00* (2006.01)
(Continued)

(52) U.S. Cl.
CPC ..... *G02B 27/0101* (2013.01); *G02B 27/0081* (2013.01); *B60K 35/00* (2013.01);
(Continued)

(58) Field of Classification Search
CPC .... G02B 1/118; G02B 27/01; G02B 27/0101; G02B 27/0103; G02B 27/0081; G02B 2027/0123; B60K 2370/1529; B60K 35/00; B60K 2370/741; B60K 2370/52; B60K 2370/25; B60K 2370/39
See application file for complete search history.

(56) References Cited

U.S. PATENT DOCUMENTS

| 7,656,585 B1* | 2/2010 | Powell | G02B 5/1861 |
| | | | 349/11 |
| 7,924,146 B2 | 4/2011 | Seder et al. | |

(Continued)

FOREIGN PATENT DOCUMENTS

| CN | 106233185 A | * 12/2016 | ............. B60K 35/00 |
| CN | 112346251 A | * 2/2021 | ......... G02B 27/0101 |

(Continued)

OTHER PUBLICATIONS

U.S. Appl. No. 17/004,249, filed Aug. 27, 2020, Seder et al.
(Continued)

*Primary Examiner* — Thomas A Hollweg
*Assistant Examiner* — Mary A El-Shammaa (57) ABSTRACT

A waveguide head-up display (HUD) includes a waveguide that includes a lower surface and an upper surface and is configured to receive an input and project, based on the input, at least one image from the upper surface and into an eyebox, and a prism arranged at least one of on and above the waveguide. The prism includes a lower surface facing the waveguide and configured to receive the at least one image and an upper surface opposite the lower surface configured to project the at least one image received via the lower surface of the prism. The upper surface of the prism is angled relative to the upper surface of the waveguide such that a first normal of the upper surface of the prism is different from a second normal of the upper surface of the waveguide.

14 Claims, 5 Drawing Sheets

(51) Int. Cl.
*G02B 1/118* (2015.01)
*B60K 35/00* (2006.01)

(52) U.S. Cl.
CPC .. *B60K 2370/1529* (2019.05); *B60K 2370/25* (2019.05); *B60K 2370/39* (2019.05); *B60K 2370/52* (2019.05); *B60K 2370/741* (2019.05); *G02B 1/118* (2013.01); *G02B 2027/0118* (2013.01); *G02B 2027/0123* (2013.01)

(56) References Cited

U.S. PATENT DOCUMENTS

| | | |
|---|---|---|
| 7,936,489 B2 | 5/2011 | Brandt et al. |
| 8,098,170 B1 | 1/2012 | Szczerba et al. |
| 8,098,171 B1 | 1/2012 | Szczerba et al. |
| 8,164,548 B2 | 4/2012 | Kimura |
| 8,269,652 B2 | 9/2012 | Seder et al. |
| 8,317,329 B2 | 11/2012 | Seder et al. |
| 8,344,894 B2 | 1/2013 | Szczerba et al. |
| 8,350,724 B2 | 1/2013 | Szczerba et al. |
| 8,358,224 B2 | 1/2013 | Seder et al. |
| 8,384,531 B2 | 2/2013 | Szczerba et al. |
| 8,384,532 B2 | 2/2013 | Szczerba et al. |
| 8,395,529 B2 | 3/2013 | Seder et al. |
| 8,514,099 B2 | 8/2013 | Seder et al. |
| 8,514,101 B2 | 8/2013 | Mathieu et al. |
| 8,547,298 B2 | 10/2013 | Szczerba et al. |
| 8,605,011 B2 | 12/2013 | Seder et al. |
| 8,606,430 B2 | 12/2013 | Seder et al. |
| 8,629,784 B2 | 1/2014 | Szczerba et al. |
| 8,629,903 B2 | 1/2014 | Seder et al. |
| 8,633,979 B2 | 1/2014 | Szczerba et al. |
| 8,686,872 B2 | 4/2014 | Szczerba et al. |
| 8,692,739 B2 | 4/2014 | Mathieu et al. |
| 8,704,653 B2 | 4/2014 | Seder et al. |
| 8,711,486 B2 | 4/2014 | Tsimhoni et al. |
| 8,781,170 B2 | 7/2014 | Mathieu et al. |
| 8,818,708 B2 | 8/2014 | Mathieu et al. |
| 8,912,978 B2 | 12/2014 | Szczerba et al. |
| 8,924,150 B2 | 12/2014 | Tsimhoni et al. |
| 8,941,690 B2 | 1/2015 | Seder et al. |
| 8,977,489 B2 | 3/2015 | Szczerba et al. |
| 9,008,904 B2 | 4/2015 | Szczerba et al. |
| 9,057,874 B2 | 6/2015 | Seder et al. |
| 9,162,622 B2 | 10/2015 | Szczerba et al. |
| 9,443,429 B2 | 9/2016 | Mathieu et al. |
| 9,714,110 B2 * | 7/2017 | Veltrop ............... F25D 23/126 |
| 10,302,937 B2 | 5/2019 | Ferris et al. |
| 10,747,314 B1 | 8/2020 | Chang et al. |
| 10,816,816 B2 | 10/2020 | Chang |
| 10,860,093 B1 | 12/2020 | Chang et al. |
| 10,880,529 B2 | 12/2020 | Chang et al. |
| 10,926,638 B1 | 2/2021 | Chang et al. |
| 10,996,470 B2 | 5/2021 | Chang et al. |
| 10,996,480 B1 | 5/2021 | Chang et al. |
| 10,996,481 B1 | 5/2021 | Wells et al. |
| 11,024,056 B2 | 6/2021 | Chang et al. |
| 11,106,044 B2 | 8/2021 | Seder et al. |
| 11,347,063 B2 * | 5/2022 | Bhargava ............ G02B 27/0955 |
| 11,513,350 B2 * | 11/2022 | Waldern ............. G02B 27/0093 |
| 2007/0291355 A1 * | 12/2007 | Tanijiri ............... G02B 27/0172 359/467 |
| 2016/0109701 A1 | 4/2016 | Goldman-Shenhar et al. |
| 2017/0161949 A1 | 6/2017 | Seder et al. |
| 2017/0161950 A1 | 6/2017 | Seder et al. |
| 2020/0073138 A1 | 3/2020 | Chang |
| 2020/0310113 A1 | 10/2020 | Chang et al. |
| 2020/0371351 A1 * | 11/2020 | Chang .................... B60K 37/02 |
| 2021/0041694 A1 | 2/2021 | Chang et al. |
| 2021/0041695 A1 | 2/2021 | Chang et al. |
| 2021/0055549 A1 | 2/2021 | Chang et al. |
| 2021/0132404 A1 | 5/2021 | Harden et al. |
| 2021/0141223 A1 | 5/2021 | Chang et al. |
| 2021/0157135 A1 | 5/2021 | Wells et al. |
| 2021/0157142 A1 * | 5/2021 | Scheller ................ H01L 24/08 |
| 2021/0199873 A1 * | 7/2021 | Shi ..................... G02B 27/0018 |
| 2021/0239996 A1 | 8/2021 | Harden, Jr. et al. |
| 2021/0255459 A1 * | 8/2021 | Christmas .......... G02B 27/0101 |

FOREIGN PATENT DOCUMENTS

| | | | | |
|---|---|---|---|---|
| CN | 112433368 A | * | 3/2021 | ......... G02B 27/0172 |
| CN | 213715609 U | * | 7/2021 | ......... G02B 27/0101 |
| WO | WO-2015078788 A1 | * | 6/2015 | ......... G02B 27/0081 |
| WO | WO-2020212682 A1 | * | 10/2020 | ......... G02B 17/0856 |
| WO | WO-2020212684 A1 | * | 10/2020 | ........... G02B 17/086 |
| WO | WO-2021219331 A1 | * | 11/2021 | |

OTHER PUBLICATIONS

U.S. Appl. No. 17/068,393, filed Oct. 12, 2020, Seder et al.
U.S. Appl. No. 16/985,377, filed Aug. 5, 2020, Baltaxe et al.
U.S. Appl. No. 17/106,782, filed Nov. 30, 2020, Seder et al.
U.S. Appl. No. 17/038,356, filed Sep. 30, 2020, Chang et al.
U.S. Appl. No. 17/101,013, filed Nov. 23, 2020, Seder et al.
U.S. Appl. No. 17/237,864, filed Oct. 22, 2021, Seder et al.
U.S. Appl. No. 17/237,815, filed Apr. 22, 2021, Seder et al.
U.S. Appl. No. 17/231,719, filed Apr. 15, 2021, Chang et al.
U.S. Appl. No. 17/231,707, filed Apr. 15, 2021, Seder et al.
U.S. Appl. No. 17/306,081, filed May 3, 2021, Chang et al.
U.S. Appl. No. 17/313,134, filed May 6, 2021, Chang et al.
Disclosed Anonymously "Optical Speckle Mitigation" Questel Research Disclosures, Feb. 2021 Research Disclosure Journal; URL: https://www.researchdisclosure.com/database/RD682073.

* cited by examiner

CONTROL OF AMBIENT LIGHT REFLECTED FROM PUPIL REPLICATOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to reducing interference from ambient light in an image projected from a waveguide head-up display (HUD) to a windshield of a vehicle.

A waveguide HUD (e.g., a holographic HUD) projects a holographic image onto the windshield of the vehicle. The area visible to (i.e., within a line of sight of) an occupant of the vehicle and where the HUD projects the image may be referred to as an eyebox. The waveguide HUD (e.g., a reflective or diffractive waveguide HUD) may include a pupil replicator or expander configured to fill the eyebox with an array of holograms. For example, the waveguide HUD includes a slab of optic glass with reflective or diffractive coatings. Holograms input to the optic glass of the waveguide HUD are replicated and projected at a desired trajectory (e.g., in some examples, along a normal of a face of the optic glass. The holograms exit the face of the optic glass along the normal (e.g., exiting an opening in an instrument panel or other structure comprising the waveguide HUD) and reflect off the windshield into the eyebox.

SUMMARY

A waveguide head-up display (HUD) includes a waveguide that includes a lower surface and an upper surface and is configured to receive an input and project, based on the input, at least one image from the upper surface and into an eyebox, and a prism arranged at least one of on and above the waveguide. The prism includes a lower surface facing the waveguide and configured to receive the at least one image and an upper surface opposite the lower surface configured to project the at least one image received via the lower surface of the prism. The upper surface of the prism is angled relative to the upper surface of the waveguide such that a first normal of the upper surface of the prism is different from a second normal of the upper surface of the waveguide.

In another feature, the at least one image includes a phase hologram.

In another feature, the waveguide is a pupil replicator.

In another feature, the waveguide is a pupil expander.

In another feature, the upper surface of the prism is configured to deflect ambient light directed at the waveguide away from the eyebox.

In another feature, the first normal of the upper surface of the prism is selected such that ambient light having an incident angle within a predetermined range of the first normal is directed away from the eyebox.

In another feature, the prism comprises a first material having a first index of refraction arranged on a second material having a second index of refraction.

In another feature, the waveguide HUD further includes an anti-reflective (AR) coating on the lower surface of the prism.

In another feature, the AR coating is a moth eye AR coating.

In another feature, the waveguide HUD further includes a filter coating on the upper surface of the prism.

In another feature, the filter coating is configured as a triple bandpass filter.

In another feature, a vehicle includes the waveguide HUD.

A method includes determining a desired location of an eyebox for at least one image projected from a waveguide head-up display (HUD. The waveguide HUD includes a waveguide and a prism and the at least one image is projected from the waveguide and through the prism. The method further includes determining a location of the waveguide HUD based on the desired location of the eyebox and determining an index of refraction of the prism based on the desired location of the eyebox and the determined location of the waveguide. The index of refraction is selected such that the at least one image as projected from the prism is offset in a lateral direction from the at least one image as projected from the waveguide. The method further includes installing the waveguide HUD in the determined location.

In another feature, the at least one image includes a phase hologram.

In another feature, the prism includes a first material having a first index of refraction n1 arranged on a second material having a second index of refraction n2, and wherein determining the index of refraction of the prism includes determining a ratio of n1 to n2.

In another feature, the method further includes arranging the prism at least one of on and above the waveguide.

In another feature, the method further includes arranging an anti-reflective (AR) coating on a lower surface of the prism.

In another feature, the AR coating is a moth eye AR coating.

In another feature, the method further includes arranging a filter coating on an upper surface of the prism.

In another feature, the determined location is inside a vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Ambient light (e.g., sunlight, exterior or interior lighting, etc.) may reflect off a pupil replicator of a holographic waveguide head-display (HUD) and into an eyebox of an occupant of a vehicle. The ambient light reflected into the eyebox overlaps with an array of phase holograms projected into the eyebox. For example, the ambient light causes glare, reduces HUD image contrast, etc.

Waveguide HUD systems and methods according to the present disclosure are configured to decouple lights paths of ambient light reflected off the pupil replicator (e.g., a slab of optic glass) from the phase holograms. For example, a prism is arranged on or above an upper surface (i.e., an output face) of the waveguide HUD. An upper surface of the prism is not parallel to the upper surface of the waveguide HUD. In other words, the upper surface of the prism is angled relative to the upper surface of the waveguide HUD.

Accordingly, ambient light is reflected off of the upper surface of the prism and directed outside of the eyebox. Conversely, the phase hologram output from the waveguide HUD is simply offset in a lateral direction. In other examples, the upper surface of the waveguide HUD itself may be angled relative to a lower surface (i.e., an input surface) of the waveguide HUD.

Figure 1:
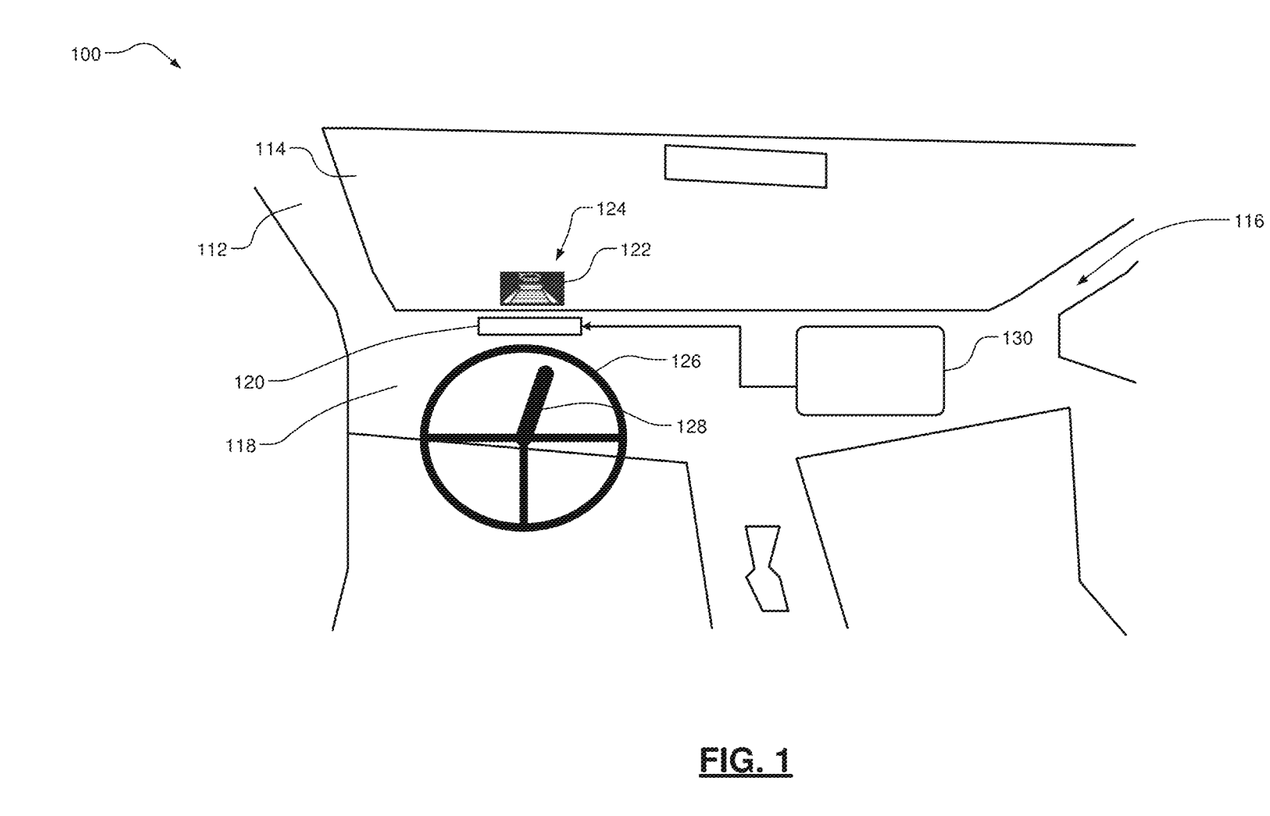
FIG. 1 is an example vehicle including a waveguide head-up display (HUD)

Referring now to FIG. 1, a vehicle 100 in includes a body structure 112 and a windshield 114 that enclose a cabin 116 of the vehicle 100. In addition, the vehicle 100 includes a dashboard 118 mounted to the body structure 112, and a head-up display (HUD) 120 (e.g., a holographic waveguide HUD) that projects an image 122 onto the windshield 114. The area of the windshield 114 where the HUD 120 projects the image 122 is referred to as an eyebox 124. In FIG. 1, the eyebox 124 is depicted as having a rectangular perimeter. Further, the vehicle 100 includes a steering wheel 126, a steering column 128, and a system control module 130.

The system control module 130 controls the HUD 120 to project holographic images such as the image 122 into the eyebox 124. The images projected by the HUD 120 may include text, symbols, and/or gauges. The system control module 130 may control the content of the images to be projected by the HUD 120 and/or the location and distortion of the images to be projected by the HUD 120. The HUD 120 according to the present disclosure is configured to decouple lights paths of ambient light reflected off a pupil replicator from the image 122 as described below in more detail.

Figure 2A:
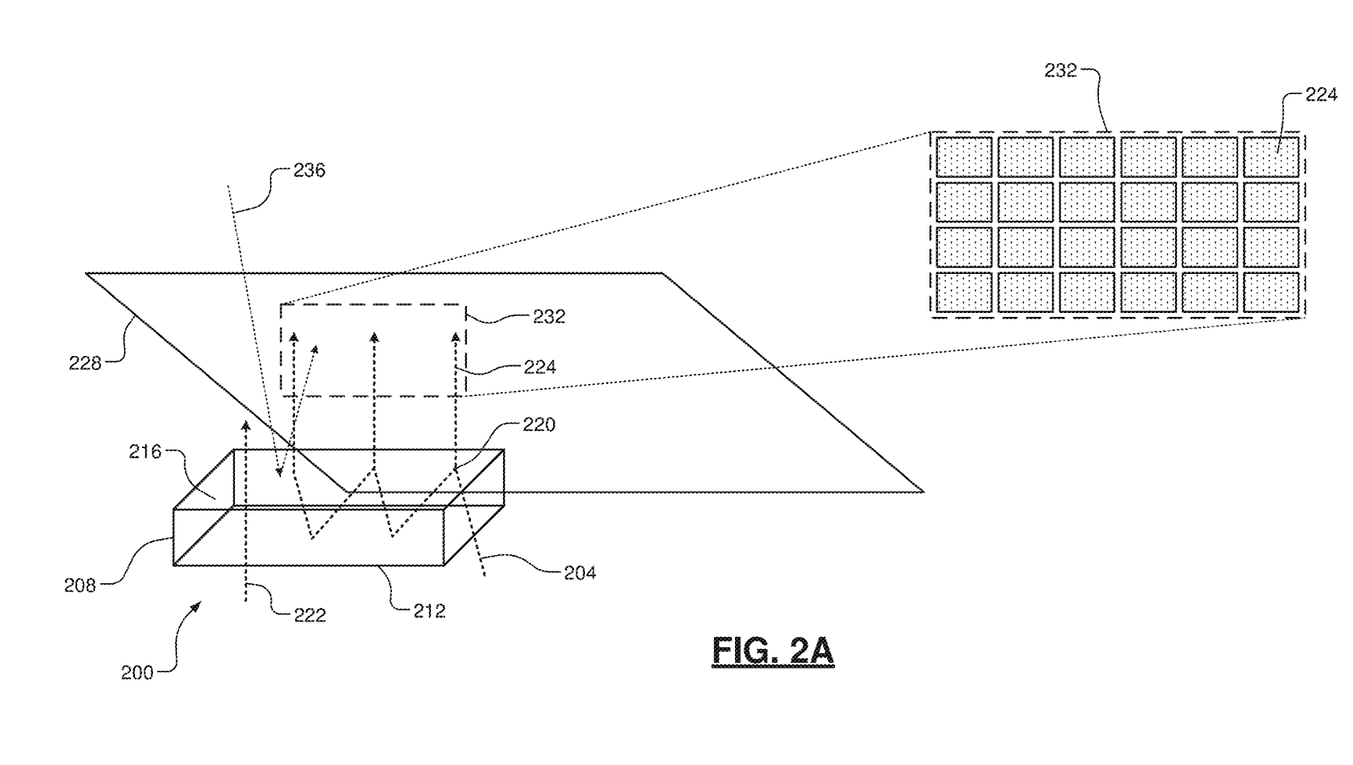
FIG. 2A is an example waveguide HUD.

Referring now to FIG. 2A, a holographic waveguide HUD 200 receives, as an input 204, a hologram. The input hologram is transmitted into a waveguide (e.g., a waveguide such as a pupil replicator 208) of the HUD 200. The pupil replicator 208 may be implemented as a slab of optic glass including a broadband reflective coating on a lower surface 212 and an upper surface 216. For example, the coating on the lower surface 212 may provide 100% broadband reflection while the coating on the upper surface 216 may provide less than 100% broadband reflection. In other examples, the reflective coating may provide non-broadband reflection.

The reflection of the coating on the upper surface 216 is selected of the top coating is selected to achieve equal luminance for each hologram exiting the pupil replicator 208. For example, the hologram is input to the lower surface 212 at a total internal reflection (TIR) angle. At each reflection event 220, a portion of the hologram exits the upper surface 216 at a normal 222 of the pupil replicator 208 (i.e., in a direction perpendicular to the upper surface 216). Accordingly, a plurality of holographic images 224 are projected toward a windshield 228 and into an eyebox 232. Each of the projected images 224 contains the same content (i.e., the content of the input 204). As such, as line of sight within the eyebox 232 varies, the same image is seen by the driver. Although described as a single array waveguide, in other examples the HUD 200 may be configured to project a two-dimensional array of holograms into the eyebox 232.

Ambient light 236 (e.g., sunlight, exterior or interior lighting, etc.) may reflect off the upper surface 216 of the pupil replicator 208 and into the eyebox 232. The ambient light 236 is reflected at a reflection angle equal to an incident angle (i.e., an arrival angle). Portions of the ambient light 236 having an incident angle near (e.g., within 10 degrees) the normal 222 of the pupil replicator 208 may be reflected into the eyebox 232. The ambient light 236 reflected into the eyebox 232 interferes with the images 224 projected into the eyebox 232 and may cause glare, reduce HUD image contrast, etc.

Figure 2B:
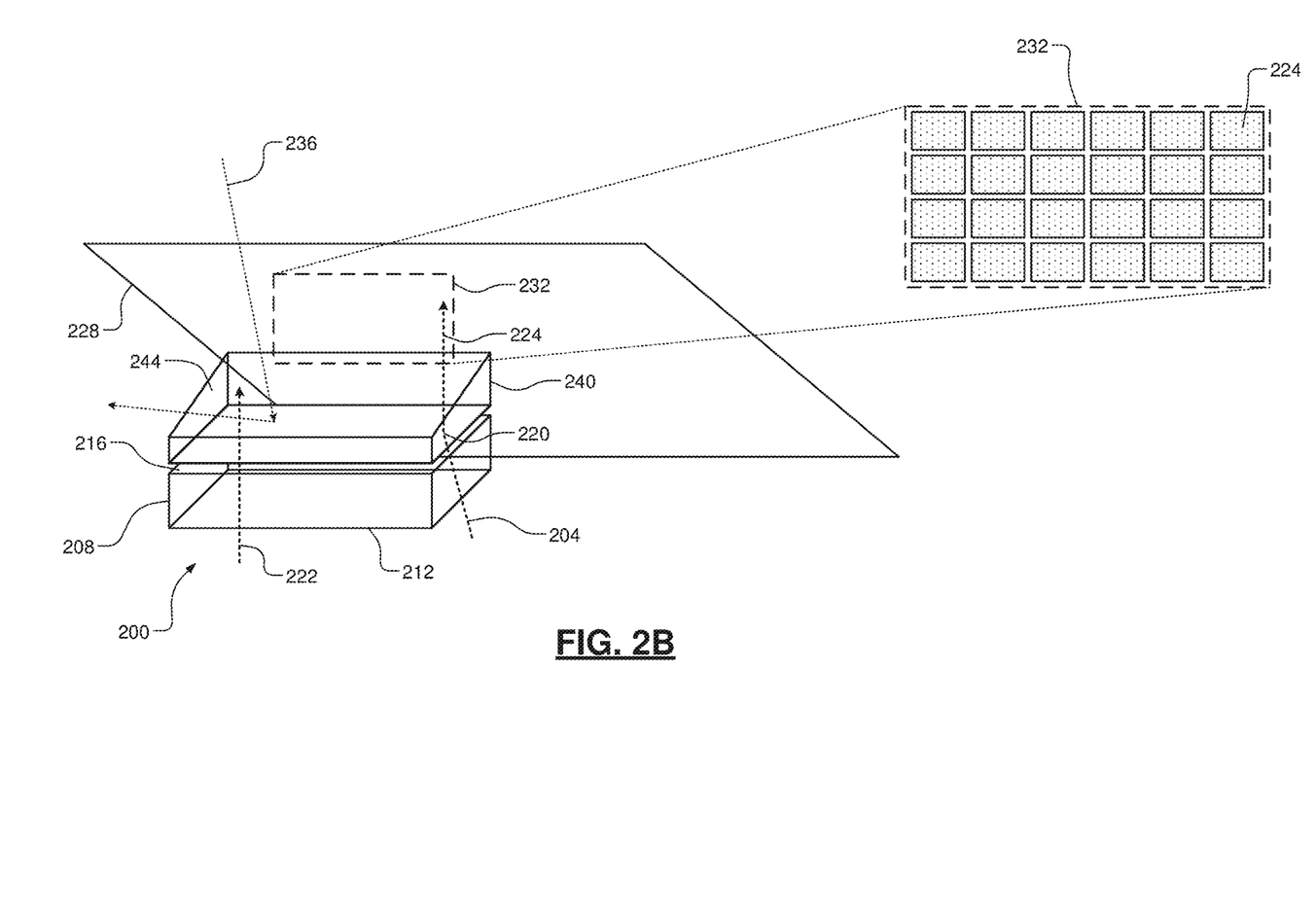
FIG. 2B is an example waveguide HUD including a prism.
Figures 2C, 3A:
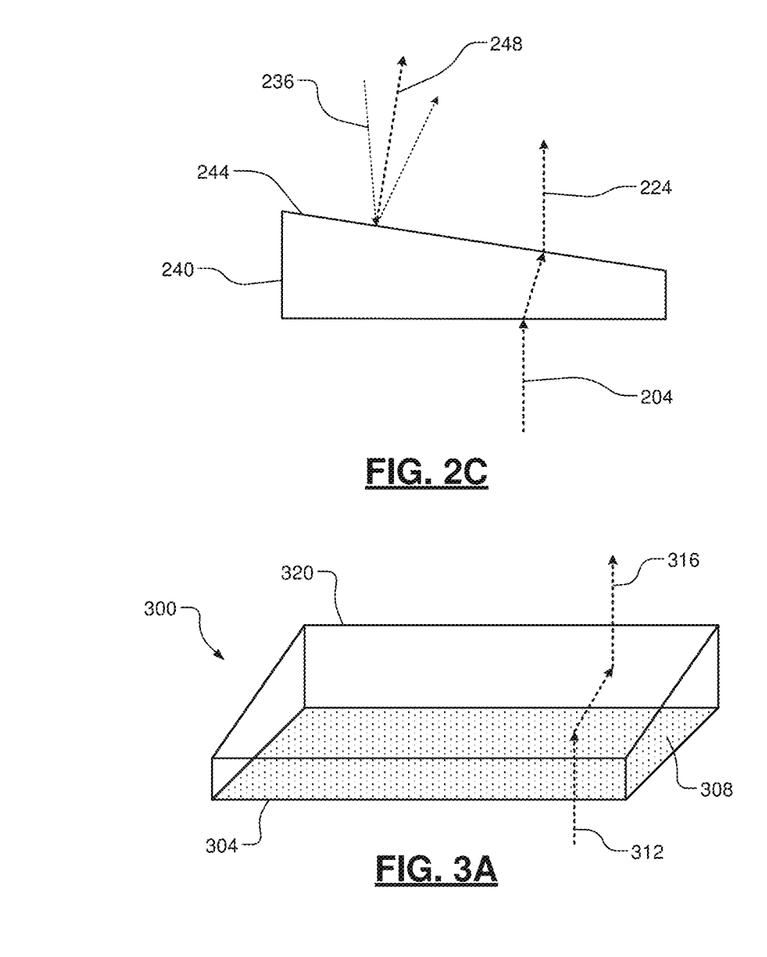
FIG. 2C is an example prism for a waveguide HUD.
FIG. 3A is an example prism for a waveguide HUD including an anti-reflective coating.
Figures 2D, 3B:
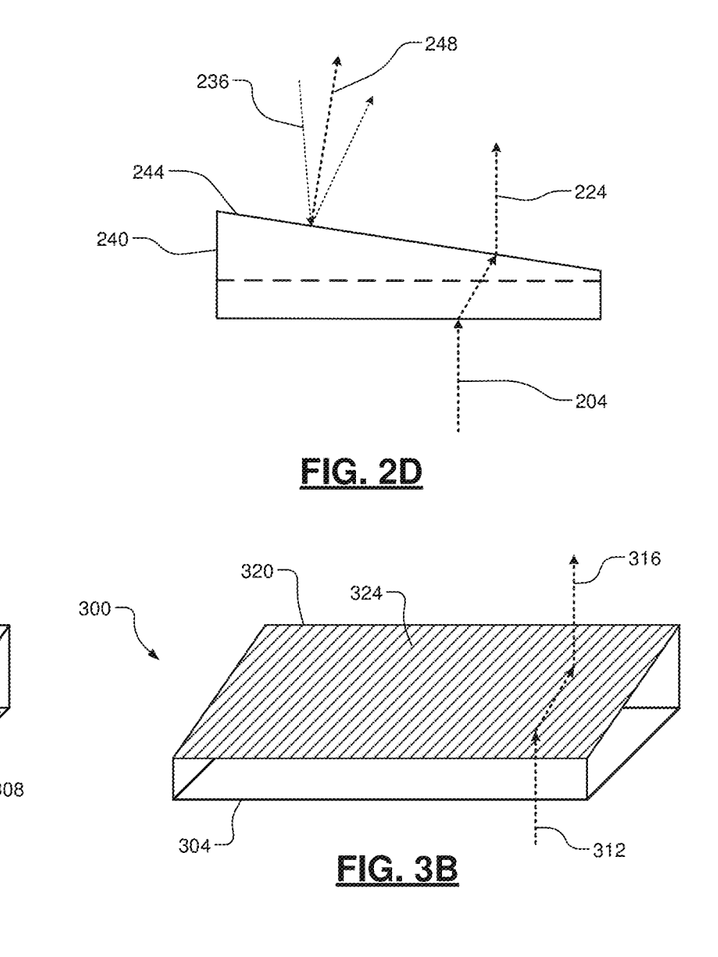
FIG. 2D is another example prism for a waveguide HUD.
FIG. 3B is an example prism for a waveguide HUD including a filter coating.

Referring now to FIGS. 2B, 2C, and 2D, the HUD 200 according to the present disclosure is configured to decouple light paths of the ambient light 236 reflected off the pupil replicator 208 from the eyebox 232. For example, the HUD 200 includes a prism 240 (e.g., a slab of optic glass configured as a prism) arranged on or above the upper surface 216 of the pupil replicator 208. An upper surface 244 of the prism 240 is not parallel to the upper surface 216 of the pupil replicator 208. In other words, the upper surface 244 of the prism 240 is angled relative to the upper surface 216 of the pupil replicator 208 and a normal 248 of the prism 240 (as shown in a side view of the prism 240 in FIGS. 2C and 2D) is different from (e.g., not parallel to) the normal 222 of the pupil replicator 208.

Accordingly, the ambient light 236 is reflected off of the upper surface 244 of the prism 240 and directed outside of the eyebox 232. Conversely, the holographic images 224 output from the pupil replicator 208 are still projected along the normal 222 of the pupil replicator 208 toward the eyebox 232. As shown in FIGS. 2B and 2C, the images 224 exit the upper surface 244 of the prism 240 at a location that is displaced or offset (i.e., in a lateral direction) relative to the input 204. In other words, although the images 224 are projected along the normal 222 of the pupil replicator 208, the eyebox 232 is shifted in a lateral direction in a manner consistent with the offset of the projection of the images 224. Accordingly, a position of the HUD 200 within the vehicle (e.g., a position of the HUD 200 on an instrument panel, dashboard, etc.) may be selected to compensate for the lateral projection offset of the images 224).

An amount of the offset is dependent in part upon an index of refraction n of a material of the prism 240. As shown in FIG. 2C, the prism 240 has an index of infraction n1 causing a first offset of the images 224. Conversely, as shown in FIG. 2D, the prism 240 is comprised of two materials (e.g., a first material having an index of infraction n1 arranged on a second material having an index of infraction n2). Accordingly, the prism 240 shown in FIG. 2D has a second offset different from (e.g., greater than) the first offset of FIG. 2C. For example the second offset corresponds to a ratio of n1 to n2. In this manner, by varying n1 and/or n2, the amount of the offset can be controlled based on desired or optimal locations of the HUD 200 and the eyebox 232 within the cabin of the vehicle. In other words, in different vehicles, the HUD 200 may be shifted forward (i.e., toward the windshield 228), backward (i.e., away from the windshield 228, etc. and n1 or n2 may be selected to achieve a desired location of the eyebox 232.

Although, as described above, the prism 240 is arranged above the pupil replicator 208, in other examples the prism 240 may be omitted and the upper surface 216 of the pupil replicator 208 is angled relative to the lower surface 212. In other words, the pupil replicator 208 itself may be configured as a prism. Further, although described as being configured as a pupil replicator, in other examples the HUD 200 may be configured as a diffractive pupil expander.

Referring now to FIGS. 3A and 3B, other example embodiments of a prism 300 for the HUD 200 are shown. Although described as separate embodiments, the features of the prisms 300 of FIGS. 3A and 3B can be implemented in the same embodiment.

As shown in FIG. 3A, a lower surface 304 of the prism 300 includes an anti-reflective (AR) coating or film 308. For example, the coating 308 is a moth eye AR coating. Portions of a hologram input 312 projected at the prism 300 (e.g., from the pupil replicator 208) may be reflected from the lower surface 304, causing loss of images, double images, etc. The AR coating 308 prevents reflection of the hologram input 312 off of the lower surface 304, maximizing an amount of the hologram input 312 that passes through the prism 300 as a holographic image 316.

As shown in FIG. 3B, an upper surface 320 of the prism 300 includes a filter coating 324. For example, the filter coating 324 is a triple bandpass filter that is disposed on the upper surface 320 and tuned to the hologram input 312. Some ambient light reflected from the upper surface 320 (or, from the lower surface 304, from an upper surface of the pupil replicator 208, etc.) may be directed toward the eyebox 232. The filter coating 324 blocks the reflected ambient light from being projected toward the eyebox 232 while permitting transmission of the holographic image 316.

Figure 4:
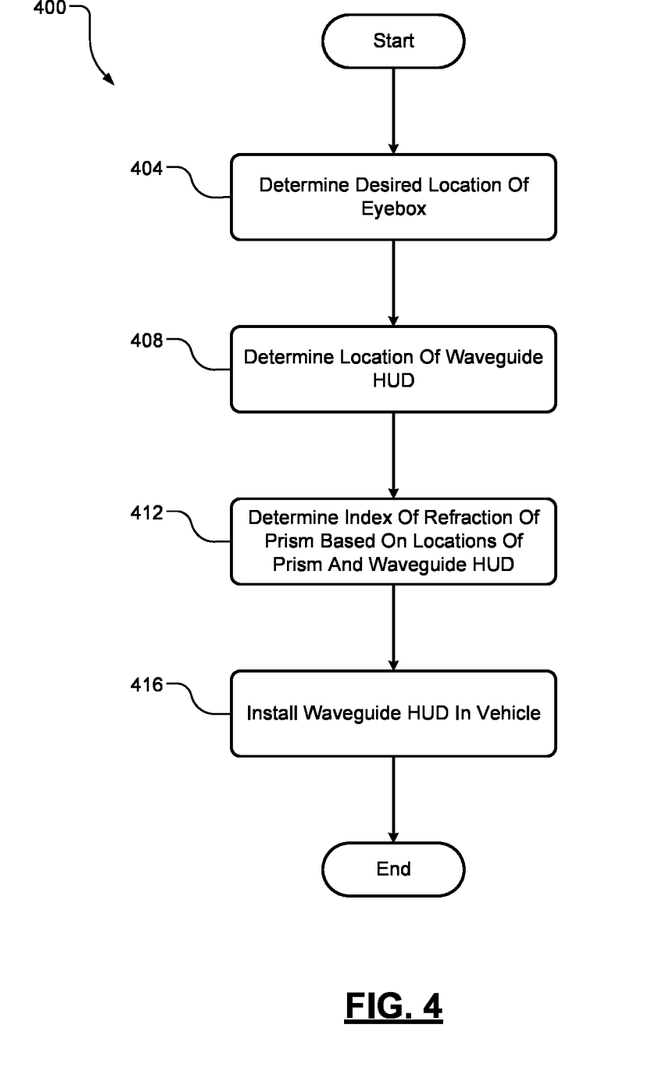
FIG. 4 illustrates steps of an example method of installing a waveguide HUD.

FIG. 4 shows an example method 400 of installing a holographic waveguide HUD in a vehicle according to the present disclosure. At 404, a desired location of an eyebox is determined. For example, the location of the eyebox may be determined based on predicted lines-of-sight of a driver or other occupant of the vehicle and one or more vehicle features (e.g., locations of an instrument panel, orientation of a windshield, steering wheel position, etc.). At 408, a location of the waveguide HUD in the vehicle is identified based on the desired location of the eyebox. For example, one or more possible locations for the waveguide HUD may be determined and the identified location is selected from among the one or more possible locations. The location may be identified based in part on a range of possible projection locations of the holographic image that can be achieved by varying an index of refraction n of a prism of the waveguide HUD.

At 412, an index of refraction (or a ratio n1/n2 of two indexes of refraction as described above in FIG. 2D) of the prism is determined based on the desired location of the eyebox and the identified location of the waveguide HUD. In other words, the index of refraction is selected such that the holographic image projected upward from the pupil replicator is offset a desired amount by the prism and projected into the desired location of the eyebox.

At 416, the waveguide HUD including the pupil replicator and the prism having the determined index of refraction is installed in the vehicle. For example, the waveguide HUD is installed in a location aligned with an opening in a dashboard or instrument panel such that the holographic image is projected upward, through the opening, and into the eyebox.

Although described above with respect to vehicle implementations, the waveguide HUD systems and methods according to the present disclosure may be used in non-vehicle implementations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A waveguide head-up display (HUD), the waveguide HUD comprising:
   a waveguide including a lower surface and an upper surface, wherein the waveguide is configured to receive an input and project, based on the input, at least one image from the upper surface and into an eyebox;
   a prism arranged at least one of on and above the waveguide, wherein the prism includes a lower surface facing the waveguide and configured to receive the at least one image and an upper surface opposite the lower surface configured to project the at least one image received via the lower surface of the prism,
   wherein the upper surface of the prism is angled relative to the upper surface of the waveguide such that a first normal of the upper surface of the prism is different from a second normal of the upper surface of the waveguide, and
   wherein the upper surface of the prism is configured to deflect ambient light directed at the waveguide away from the eyebox,
   wherein the first normal of the upper surface of the prism is selected such that ambient light having an incident angle within a predetermined range of the first normal is directed away from the eyebox;
   an anti-reflective (AR) coating on the lower surface of the prism; and
   a filter coating on the upper surface of the prism.

2. The waveguide HUD of claim 1, wherein the at least one image includes a phase hologram.

3. The waveguide HUD of claim 1, wherein the waveguide is a pupil replicator.

4. The waveguide HUD of claim 1, wherein the waveguide is a pupil expander.

5. The waveguide HUD of claim 1, wherein the prism comprises a first material having a first index of refraction arranged on a second material having a second index of refraction.

6. The waveguide HUD of claim 1, wherein the AR coating is a moth eye AR coating.

7. The waveguide HUD of claim 1, wherein the filter coating is configured as a triple bandpass filter.

8. A vehicle comprising the waveguide HUD of claim 1.

9. A method, comprising:
   determining a desired location of an eyebox for at least one image projected from a waveguide head-up display (HUD), wherein the waveguide HUD includes a waveguide and a prism, and wherein the at least one image is projected from the waveguide and through the prism;
   determining a location of the waveguide HUD based on the desired location of the eyebox;
   determining an index of refraction of the prism based on the desired location of the eyebox and the determined location of the waveguide, wherein the index of refraction is selected such that the at least one image as projected from the prism is offset in a lateral direction from the at least one image as projected from the waveguide; and
   installing the waveguide HUD in the determined location,
   wherein an upper surface of the prism is configured to deflect ambient light directed at the waveguide away from the eyebox,
   wherein a normal of the upper surface of the prism is selected such that ambient light having an incident angle within a predetermined range of the normal is directed away from the eyebox, an anti-reflective (AR) coating is disposed on a lower surface of the prism; and a filter coating is disposed on the upper surface of the prism.

10. The method of claim 9, wherein the at least one image includes a phase hologram.

11. The method of claim 9, wherein the prism includes a first material having a first index of refraction n1 arranged on a second material having a second index of refraction n2, and wherein determining the index of refraction of the prism includes determining a ratio of n1 to n2.

12. The method of claim 9, further comprising arranging the prism at least one of on and above the waveguide.

13. The method of claim 9, wherein the AR coating is a moth eye AR coating.

14. The method of claim 9, wherein the determined location is inside a vehicle.

\* \* \* \* \*